Figure 1:
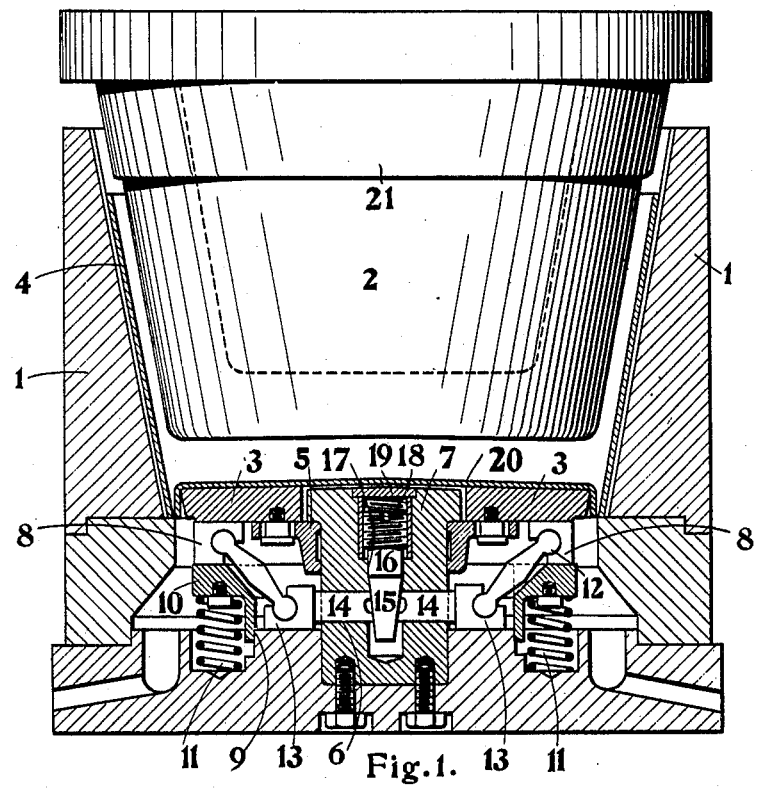

Sept. 15, 1931. G. HOMEY 1,823,102
METHOD OF PRODUCING VESSELS FROM PRESSED WOOD OR PLYWOOD
Filed Aug. 6, 1927 3 Sheets-Sheet 1

Inventor.
G. Homey
by
W. S. Evans
Attorney.

Sept. 15, 1931.  G. HOMEY  1,823,102
METHOD OF PRODUCING VESSELS FROM PRESSED WOOD OR PLYWOOD
Filed Aug. 6, 1927  3 Sheets-Sheet 2
Fig. 3.
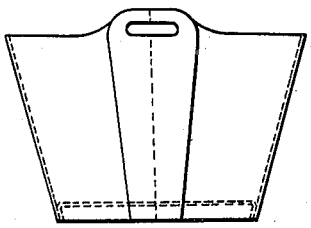
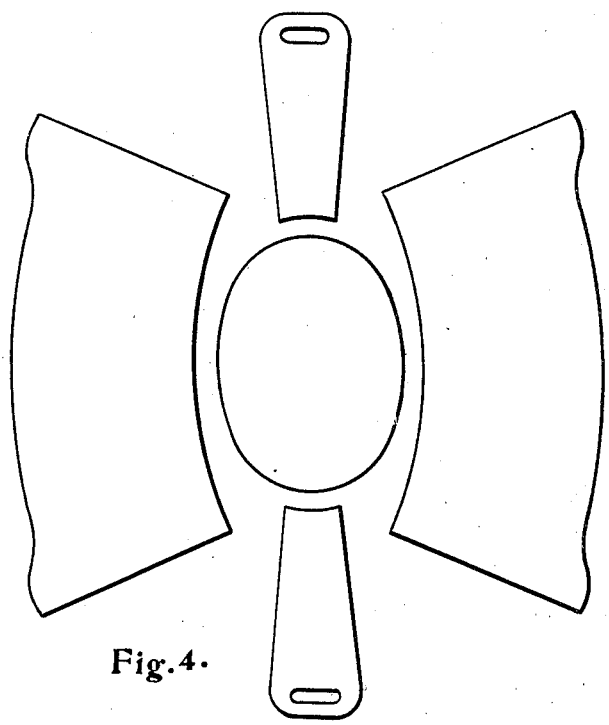
Fig. 4.
Inventor
G. Homey
by
W. E. Evans.
Attorney Sept. 15, 1931.  G. HOMEY  1,823,102
METHOD OF PRODUCING VESSELS FROM PRESSED WOOD OR PLYWOOD
Filed Aug. 6, 1927   3 Sheets-Sheet 3
Fig. 5.
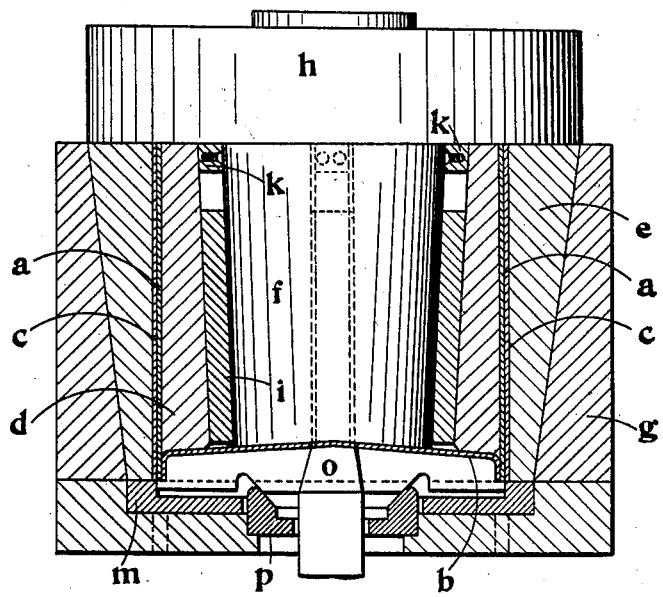
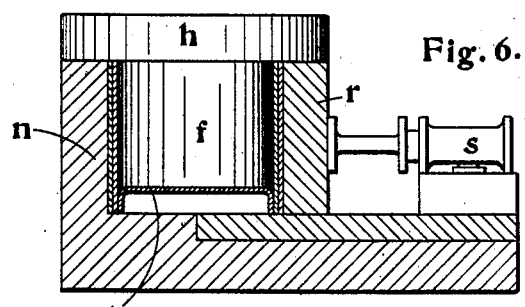
Fig. 6.
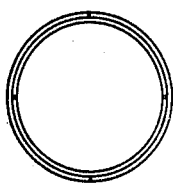
Fig. 8.
Fig. 7.
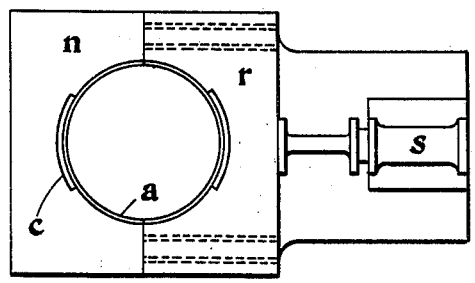
Inventor
G. Homey
by
Attorney.

Patented Sept. 15, 1931

1,823,102

UNITED STATES PATENT OFFICE

GERHARD HOMEY, OF COLOGNE, GERMANY

METHOD OF PRODUCING VESSELS FROM PRESSED WOOD OR PLYWOOD

Application filed August 6, 1927, Serial No. 211,197, and in Germany August 13, 1926.

Numerous proposals have already been made for producing vessels of pressed wood or plywood. These proposals are generally based on the idea of directly shaping the pressed wood or plywood in cylindrical or conical form by means of Fournier strips (that is to say thin strips of wood that are flexible and set one upon the other and joined together by gluing to form plywood or so-called Sperrholz) and by pressure elements corresponding in shape to the form desired, and thereupon inserting the bottom, separately or before pressing, into the press mould in such manner that after the pressing operation the finished vessels can be removed from the mould.

These proposals have no practical importance as it is much quicker and surer to produce the vessels from the parts held together by bands than it is to build up the pressed wood or plywood in cylindrical form. The fitting in of the bottom particularly involves difficulties, for which reason it has become the practice to make the vessels from strips (staves) held together by bands. Furthermore, gluing the staves together at their contiguous edges under pressure in a press mould does not represent a desirable method of constructing vessels from pressed wood or plywood, as in such case also the distinct operation of fitting the bottom in position renders the cost of production high. Casks made of staves have the disadvantage that when they become quite dry the staves can only be held together with any degree of surety by drawing in the bands. In any case experience has shown that the staves very soon become loose, for which reason the vessels are constructed but a short while before being filled and sent away. For this reason such vessels are not made for stock.

According to the invention it is proposed to make the vessels of pressed wood or plywood in such manner that the peripheral wall of the vessel, which is integral or divided into a number of parts, is enclosed within a pressing mould by a single pressing operation, and is connected to the bottom, which consists of a pressed wood or plywood sheet the edge of which is turned down, making a joint also by gluing.

In the use of this method the vessels or buckets are produced in a very short space of time, by which the cost of production is reduced to a minimum.

It is advantageous to employ a support for the bottom for joining the turned-down bottom of pressed wood or plywood, because by this means—particularly with vessels having cylindrical side walls—the bottom is joined to the side walls in the most effective manner.

The operation of pressing the edge of the bottom against the inner face of the peripheral wall is facilitated if, when providing the support for the bottom from segmental clamping blocks the latter are moved radially outward during the pressing operation, whereby the edge of the bottom is pressed against the peripheral wall by radial pressure exerted from the inside and outwardly.

The clamping blocks may be moved independently of the movement of the plunger, but on the other hand it is possible for this movement to be effected in any desired manner depending upon the movement of the plunger.

To make the contiguous edges of the peripheral wall hold firmly together the edges are covered over by strips applied outside, the upper edges of the strips being if desired formed as handles. In such case the inner face of mould space is grooved vertically, the strips of pressed wood or plywood being inserted into these grooves.

The invention may be employed both in the production of vessels tapering downwardly, and also vessels of cylindrical form. In the latter case it is advisable that the radial pressure that is to be exerted upon the walls be exerted through the intermediary of an outer and an inner press mould between which are inserted the parts of the wall.

Figure 2:
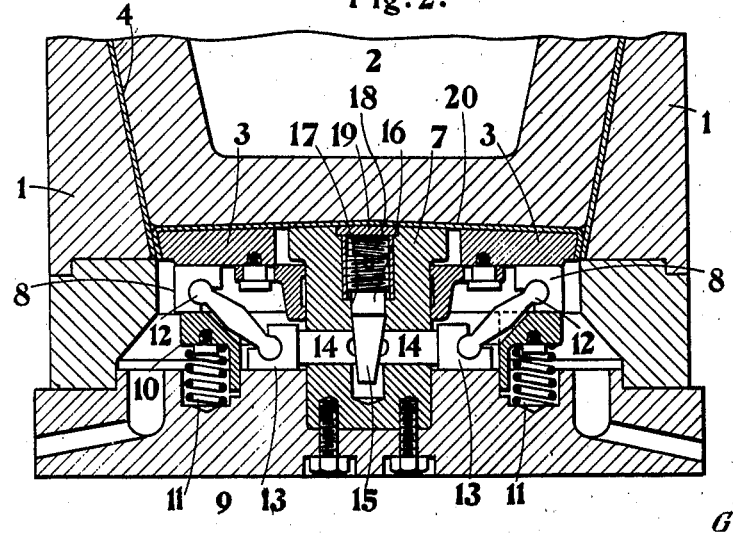

Several construction of the apparatus according to the invention are diagrammatically illustrated by way of example in the accompanying drawings, in which Figure 1 illustrates, in vertical section, a press for carrying out the process of the invention when producing conical vessels, Figure 2 shows a similar section with a different position of the movable parts of the press, Figure 3 is a side elevation of a completely pressed bucket of a particular shape, Figure 4 illustrates the parts of the bucket before being assembled, Figure 5 illustrates in vertical section the parts of a press which is employed preferably for producing cylindrical vessels, Figures 6 and 7 illustrate a modification of such a press in vertical section and in plan respectively, Figure 8 shows, in cross-section, how the separate staves or parts of a bucket produced by the press according to Figures 6 and 7 are fitted one over the other.

With reference to Figures 1 and 2, the parts comprise the press mould 1 with the press plunger 2, and the segmental clamping blocks 3. These clamping blocks which press the turned down edge of the bottom 20 against peripheral wall 4 of the vessel, are connected together by a ring 5 of angular cross-section, with respect to which ring they are movable radially. The ring 5 fits against the central stationary cylindrical guiding body 7, the diameter of which is reduced for the main part of its length. The lower faces of the clamping blocks 3 are provided with downward extensions 8, which are seated upon the ring 10, that is axially guided by a downward annular extension at 9, and presses upon springs 11. Pivoted to the extensions 8 are radially disposed links 12, which are radially inclined downwardly, the lower ends of the links 12 being pivotally connected to the slide-blocks 13. The latter are provided with cylindrical parts 14, which fit into radiating cavities in the central cylindrical guiding body 7, whose inner cavity 17 disposes itself around the conical end 15 of an axially adjustable bolt 16. This bolt has its screw-threaded head resting in the screw-threaded bore of a cylinder 18, which is closed in at the upper part by a head 19, the cylinder and head being accommodated within a correspondingly shaped and enlarged part of the upper end of the cavity 17.

By screwing in the bolt 16 or unscrewing it, the slide blocks 13 have a radial movement imparted to them, and thus, within limits, the segmental clamping blocks can be adjusted both horizontally and vertically.

The apparatus operates as follows: The two halves 4 of the wall of the vessel are first inserted in the mould 1, whereupon the bottom 20 of the vessel is placed upon the clamping blocks 3—which together form a complete circle—and the plunger 2 moves downwardly, bringing the halves of the wall of the vessel together. The axial pressure which is simultaneously imposed upon the clamping blocks 3, not only forces the latter downwardly upon the springs 11, but at the same time moves them outwardly by reason of the pivotal connection with the stationary slide blocks 13; the effect is to press the turned-down edge of the bottom of the vessel against the inner face of the wall 4 of the vessel and thus to produce a tight fit. This operation, being completed and the plunger withdrawn from the mould, the pressure on the compressed springs 11 is released, and thus the springs raise the finished vessel in the mould and allow it to be readily removed.

The essential feature of this press consists in the transmission of the axial pressure imposed in the formation of the wall of the vessel through the inserted bottom to the horizontally movable parts, the pressure being conveyed in such manner that the horizontally movable parts are at the same time pressed against the wall of the vessel. A further characteristic feature is, that the clamping blocks are not only moved horizontally but have also a vertical movement imparted to them in direction opposite to the springs or the like, so that when the pressing operation is finished the spring pressure on the finished vessel in the mould is removed and the vessel can then be more easily removed from the mould.

In order to enable the contiguous edges of the parts of the wall to be covered over by a strip the pressing mould 1 is provided radially, on oppositely disposed sides, with groove-shaped recesses as shown in Figures 3 and 4, in which the strips are placed before the pressing operation. These strips may extend above the upper edge of the wall of the vessel and be shaped like a handle, or the upper edge of the vessel may be chamfered as shown in Figure 3. In this construction the upper edge of the two strips intersects the upper edge of the wall of the vessel. In this case the stepped-off shoulder 21 of the plunger 2 is chamfered correspondingly. The shoulder 21 comes into position upon the upper edge of the halves of the wall and thereby brings them automatically into correct position before pressing.

As above mentioned, Figures 5, 6 and 7 illustrate parts intended to be used preferably in the production of cylindrical vessels. In these cases, as in the example hereinbefore described, the wall of the vessel is formed of two sheets $a$ of pressed wood or plywood. These are covered along their contiguous edges with strips $c$ of the pressed wood or plywood, and in the finished condition they are held together by the strips. The bottom $b$ also has its edge turned down, the turned-down part being pressed against the wall of the vessel by the clamping blocks which form a support for the bottom.

An annular inner press mould $d$, divided into four segments, in the axial direction and a similar annular outer press mould $e$ similarly divided into four segments in the axial direction are employed for pressing the wall of the vessel, so that thus the wall is compressed by radial pressure between the two press moulds $d$ and $e$. The segments of the inner press mould $d$ are forced apart by the conical plunger $f$, which is driven vertically downwards, while the segments of the outer press mould $e$, which are provided in the conical cavity in the casing $g$, are pressed together by the press head $h$. A loose connection is provided between the press head $h$ with the plunger $f$, and the inner press mould $d$, such that the plunger $f$ has fan-tail ribs $i$ which engage in the fan-tail grooves formed by the juxtaposed segments of the press mould $d$ and press against projections $k$ on the head of the inner press mould $d$ when the plunger $f$ is raised.

When the press head $h$ is in the raised position, the segments of the inner press mould $d$ are pressed together, but the segments of the outer press mould $e$ are forced apart because an injector $m$ has already slightly raised the outer press mould. First the strips $c$ and then the two pressed wood or plywood sheets $a$ are inserted, whereupon the press head $h$ falls with the plunger $f$ in order thus to force apart the inner mould parts $d$ and to draw the outer mold parts $e$ together. The latter action is effected by the press head $h$. At the same time the turned-down edge of the two sheets are pressed radially against the wall of the vessel in the manner shown in Figures 1 and 2.

The construction described is somewhat different from that illustrated by Figures 1 and 2; in the present case the seperate clamping blocks for the bottom are forced apart by a conical mandrel $o$, so that they press the turned-down edge of the two sheets $d$ against the inner face of the wall of the pressed wood or plywood sheets $a$. The clamping blocks are withdrawn by means of the ring $p$ the surfaces of which are conical and which act upon correspondingly shaped conical faces of the clamping blocks. It will be understood that the clamping blocks can be forced apart by other means, for example by eccentrics or similar devices. In practice the clamping blocks are withdrawn in different ways. In contradistinction to the apparatus shown in Figures 1 and 2, the clamping members in the present construction exert pressure independently of the plunger but at the same time simultaneously therewith. This operation being completed, the press head $h$ is again raised with the stamp, while the ejector $m$, which may be raised in any desider manner, presses the vessel or cask upwardly and slightly raises the outer press mould $e$.

The radial pressure for the wall of the vessel can be secured by compressing the divided outer press mould by direct radial pressure, that is to say, not by the intermediary of the axial pressure of the plunger; in such case the inner press mould consists either of a rigid block or, as in the last construction described, it may be divided and forced apart.

In Figures 6 and 7 an apparatus is illustrated in longitudinal section and plan, in which to carry out the process the inner mould consists of a rigid block $n$. (In Figure 7 the head $h$ of the inner press mould $f$ is shown removed.) The outer press mould consists of the stationary clamping block $n$ and of the radially movable clamping block $r$, which can be pressed against the inner press mould $f$ and retracted therefrom by means of an hydraulic cylinder and plunger $s$. The method of using the latter is obvious. It will be understood that below the bottom $b$ means may be provided for pressing the turned-down edge radially against the wall of the vessel. Both clamping blocks $n$ and $r$ may be movable, that is to say an hydraulic press could be provided for the clamping block $n$. The pressure might be secured in any other manner than by hydraulic means.

Figure 8 shows how the wall could be formed of layers each of which consists of two sheets of pressed wood or plywood, the contiguous edges being placed opposite one to another. In such case the two outer sheets of pressed wood or plywood replace in a certain sense the strips $c$ which in the constructions hereinbefore described cover the contiguous edges of the two sheets of pressed wood or plywood $a$.

To complete the cask a lid is used which is similar to the bottom.

The presses employed for carrying out the method according to the invention are not limited structurally to such as those illustrated. It will be obvious that they may be constructed differently without departing from the invention.

The invention consists generally in assembling the parts of the wall of the vessel and fitting the turned-down bottom against the wall all in a single operation.

In practice one or other of the press elements (that is to say the plunger and the support for the bottom) are preferably made hollow and heated by steam or by any other heating medium.

It will be understood that as in processes of the kind to which the invention relates in which a number of strips of wood are used for the manufacture of vessels the respective parts constituting the peripheral wall and the jointing faces between the peripheral wall and the flange of the bottom of the vessel have glue applied between them before being set into the mould.

I claim:

1. A method of producing vessels from pressed wood or plywood by the application of pressure within a mould space within which the respective constituent parts of the vessel are set to be completely enclosed, consisting in the compression and consolidation of the parts forming the peripheral wall of the vessel and the simultaneous application of pressure outwardly from the direction of the centre line of the said mould space to form a joint between the down turned edge of the bottom formed of pressed wood or plywood and the internal face of the parts forming the peripheral wall by pressure of the said down turned edge against the said peripheral wall for the consolidation of the said bottom with the said peripheral wall in a single operation, substantially as hereinbefore described.

2. A method of producing vessels from pressed wood or plywood by the application of pressure within a mould space within which the respective constitutent parts of the vessel are set to be completely enclosed, consisting in the compression and consolidation of the parts forming the peripheral wall of the vessel and the simultaneous application of pressure outwardly from the direction of the centre line of the said mould space to form a joint between the down turned edge of the bottom formed of pressed wood or plywood and the internal face of the parts forming the peripheral wall by pressure of the said down turned edge against the said peripheral wall for the consolidation of the said bottom with the said peripheral wall in a single operation, and in which the compression and consolidation of the parts forming the peripheral wall of the vessel are effected by pressure applied externally of the said peripheral parts through jointing strips, substantially as hereinbefore described.

3. Apparatus for producing vessels from pressed wood or plywood comprising an outer peripheral mould part within which the parts to be connected are enclosed, a corresponding plunger and a base support at the lower part of the said mould, said base support comprising separate sliding and positively connected segmental clamping blocks adapted to have an outward radial movement in a horizontal plane and in a positively defined plane on the application of axial pressure upon the plunger, the outer edges of the said segmental clamping blocks being adapted to engage the down turned flange of the pressed wood or plywood bottom of the vessel against the wall of the said outer peripheral mould part to apply pressure for the connection of the said bottom to the inner face of the peripheral wall on the application of pressure to the plunger, substantially as hereinbefore described.

4. Apparatus for producing vessels from pressed wood or plywood comprising an outer peripheral mould part within which the parts to be connected are enclosed, a corresponding plunger and a base support at the lower part of the said mould, said base support comprising segmental clamping blocks adapted to have an outward radial movement on the application of axial pressure upon the plunger, the outer edges of the said segmental clamping blocks being adapted to engage the down turned flange of the pressed wood or plywood bottom of the vessel to apply pressure for its connection to the inner face of the peripheral wall on the application of pressure to the plunger, the inner face of the said mould having vertical grooves in determined position for the accommodation of the outer strips of wood substantially as hereinbefore described.

5. Apparatus for producing vessels from pressed wood or plywood of a number of peripheral parts and of a bottom part, comprising an outer peripheral mould part within which the parts to be connected are enclosed, a corresponding plunger, said mould being adapted for the reception of the respective parts of the vessel to be formed, and a base support at the lower part of the said mould, said base support comprising separate sliding and positively connected segmental clamping blocks adapted to have an outward radial movement in a horizontal plane and in a positively defined path on the application of axial pressure upon the plunger, the outer edges of the said segmental clamping blocks being adapted to engage the down turned flange of the pressed wood or plywood bottom of the vessel against the wall of the said outer peripheral mould part to apply pressure for the connection of the said bottom to the inner face of the peripheral wall on the application of pressure to the plunger, and means by which the said segmental clamping blocks are moved outwardly on the application of the pressure of the plunger on the said support, substantially as hereinbefore described.

6. Apparatus for producing vessels from pressed wood or plywood comprising an outer peripheral mould part within which the parts to be connected are enclosed, a corresponding plunger and a base support at the lower part of the said mould, said base support comprising segmental clamping blocks adapted to have an outward radial movement on the application of axial pressure upon the plunger, the outer edges of the said segmental clamping blocks being adapted to engage the down turned flange of the pressed wood or plywood bottom of the vessel against the wall of the said outer peripheral mould part to apply pressure for the connection of the said bottom to the inner face of the peripheral wall on the application of pressure to the plunger, and means co-operating with the segmental clamping blocks and comprising springs which on the release of pressure upon the plunger cause the relase of the vessel by its upward movement in the mould, substantially as hereinbefore described.

7. Apparatus for producing vessels from pressed wood or plywood comprising an outer peripheral mould part within which the parts to be connected are enclosed, a corresponding plunger and a base support at the lower part of the said mould, said base support comprising segmental clamping blocks adapted to have an outward radial movement on the application of axial pressure upon the plunger, the outer edges of the said segmental clamping blocks being adapted to engage the down turned flange of the pressed wood or plywood bottom of the vessel against the wall of the said outer peripheral mould part to apply pressure for the connection of the said bottom to the inner face of the peripheral wall on the application of pressure to the plunger, the said clamping blocks being pivotally connected to obliquely disposed links, the lower ends of which are held stationary and means comprising a ring and springs applied beneath the said ring by which the said clamping blocks are retracted on the withdrawal of the plunger, substantially as herinbefore described.

8. Apparatus for producing vessels from pressed wood or plywood comprising an outer peripheral mould part within which the parts to be connected are enclosed, a corresponding plunger and a base support at the lower part of the said mould, said base support comprising segmental clamping blocks adapted to have an outward radial movement on the application of axial pressure upon the plunger, the outer edges of the said segmental clamping blocks being adapted to engage the down turned flange of the pressed wood or plywood bottom of the vessel against the wall of the said outer peripheral mould part to apply pressure for the connection of the said bottom to the inner face of the peripheral wall on the application of pressure to the plunger, the said clamping blocks being pivotally connected to obliquely disposed links, the lower ends of which are held stationary, blocks within which the lower ends of the said links are hingedly mounted, said blocks being adapted to be moved radially, and means comprising a ring and springs applied beneath the said ring by which the said clamping blocks are retracted on the withdrawal of the plunger, substantially as hereinbefore described.

9. Apparatus for producing vessels from pressed wood or plywood comprising an outer peripheral mould part within which the parts to be connected are enclosed, a corresponding plunger and a base support at the lower part of the said mould, said base support comprising segmental clamping blocks adapted to have an outward radial movement on the application of axial pressure upon the plunger, the outer edges of the said segmental clamping blocks being adapted to engage the down turned flange of the pressed wood or plywood bottom of the vessel against the wall of the said outer peripheral mould part to apply pressure for the connection of the said bottom to the inner face of the peripheral wall on the application of pressure to the plunger, the said clamping blocks being pivotally connected to obliquely disposed links, the lower ends of which are held stationary, blocks within which the lower ends of the said links are hingedly mounted, said blocks being adapted to be moved radially, means comprising a central cylindrical member and radially disposed parts within the said member and an axially movable conical bolt within the said central cylindrical member by which the said blocks are adapted to be adjusted in position, and means comprising a ring and springs applied beneath the said ring by which the said clamping blocks are retracted on the withdrawal of the plunger, substantially as hereinbefore described.

10. Apparatus for producing vessels from pressed wood or plywood comprising an outer peripheral mould part within which the parts to be connected are enclosed, a corresponding plunger and a base support at the lower part of the said mould, said base support comprising segmental clamping blocks adapted to have an outward radial movement on the application of axial pressure upon the plunger, the outer edges of the said segmental clamping blocks being adapted to engage the down turned flange of the pressed wood or plywood bottom of the vessel against the wall of the said outer peripheral mould part to apply pressure for the connection of the said bottom to the inner face of the peripheral wall on the application of pressure to the plunger, the said clamping blocks being pivotally connected to obliquely disposed links, the lower ends of which are held stationary, blocks within which the lower ends of the said links are hingedly mounted, said blocks being adapted to be moved radially, means comprising a central cylindrical member and radially disposed parts within the said member and an axially movable conical bolt within the said central cylindrical member by which the said blocks are adapted to be adjusted in position, the said bolt being screw-threaded at its upper part and having a cylindrical head applied upon it the said cylindrical head being accommodated in the said central cylindrical part, and means comprising a ring and springs applied beneath the said ring by which the said clamping blocks are retracted on the withdrawal of the plunger, substantially as hereinbefore described.

11. Apparatus for producing vessels from pressed wood or plywood comprising an outer peripheral mould part within which the parts to be connected are enclosed, a corresponding plunger and a base support at the lower part of the said mould, said base support comprising separate sliding and positively connected segmental clamping blocks adapted to have an outward radial movement in a horizontal plane and in a positively defined path on the application of axial pressure upon the plunger, the outer edges of the said segmental clamping blocks being adapted to engage the down turned flange of the pressed wood or plywood bottom of the vessel against the wall of the said outer peripheral mould part to apply pressure for the connection of the said bottom to the inner face of the peripheral wall on the application of pressure to the plunger, and means for the application of heat to the plunger and the support for the bottom of the vessel to be formed, substantially as hereinbefore described.

GERHARD HOMEY.